US010688000B2

(12) United States Patent
Von Behren

(10) Patent No.: US 10,688,000 B2
(45) Date of Patent: Jun. 23, 2020

(54) TREATMENT BODY MATS

(71) Applicant: Jennifer M. Von Behren, Coeur d'Alene, ID (US)

(72) Inventor: Jennifer M. Von Behren, Coeur d'Alene, ID (US)

( * ) Notice: Subject to any disclaimer, the term of this patent is extended or adjusted under 35 U.S.C. 154(b) by 128 days.

(21) Appl. No.: 15/835,221

(22) Filed: Dec. 7, 2017

(65) Prior Publication Data

US 2018/0161226 A1    Jun. 14, 2018

Related U.S. Application Data

(60) Provisional application No. 62/432,141, filed on Dec. 9, 2016.

(51) Int. Cl.
| | | |
|---|---|---|
| *A61G 7/065* | (2006.01) | |
| *A01K 1/015* | (2006.01) | |
| *A01K 13/00* | (2006.01) | |
| *A47D 15/00* | (2006.01) | |
| *A61G 13/12* | (2006.01) | |

(52) U.S. Cl.
CPC ............ *A61G 7/065* (2013.01); *A01K 1/0157* (2013.01); *A01K 13/00* (2013.01); *A47D 15/001* (2013.01); *A61G 13/126* (2013.01)

(58) Field of Classification Search
CPC ............ A63B 21/4037; A63B 21/4039; A61G 7/05769; A61G 7/065; A61G 7/07; A61G 7/072; A61G 7/075; A61G 7/0755; A61G 7/1082; A61G 7/1084; A61G 7/1086; A61G 7/1088; A61G 7/109; A61G 7/1092; A61G 7/1094; A61G 7/1096; A61G 7/1098; A61G 13/12–1255; A61G 13/009; A61G 13/1205; A61G 13/121; A61G 13/1225; A61G 13/122; A61G 13/126; A61G 13/127; A01K 1/0157; A01K 1/353; A01K 13/00; A47C 27/14; A47C 27/142; A47C 27/144; A47C 27/146; A47D 15/001

See application file for complete search history.

(56) References Cited

U.S. PATENT DOCUMENTS

| | | | | |
|---|---|---|---|---|
| 3,310,819 A | * | 3/1967 | Morrison | A47C 27/15 267/143 |
| 4,706,313 A | * | 11/1987 | Murphy | A47C 27/15 |
| 6,275,996 B1 | * | 8/2001 | Redwood | A41D 19/0024 2/160 |
| 8,337,385 B1 | * | 12/2012 | Cornell | A61M 21/0094 600/26 |

(Continued)

FOREIGN PATENT DOCUMENTS

WO    WO-2013164851 A2 * 11/2013    ........... A61N 5/0619

OTHER PUBLICATIONS

Chakra Balancing with Healing Crystals. Jun. 10, 2014. Ryelle Eterna. http://blog.crystalrockstar.com/crystal-chakra-healing/ (Year: 2014).*

(Continued)

*Primary Examiner* — Nicholas F Polito
*Assistant Examiner* — Amanda L Bailey
(74) *Attorney, Agent, or Firm* — Wells St. John P.S.

(57) ABSTRACT

Treatment mats having a mat material with openings extending into the mat material. The openings contain stones and may additionally include a matrix material. Methods of treatment include positioning an individual proximate the treatment mat.

15 Claims, 7 Drawing Sheets

(56) References Cited

U.S. PATENT DOCUMENTS

| | | | | |
|---|---|---|---|---|
| 9,504,333 | B2* | 11/2016 | Rawls-Meehan | A47C 7/027 |
| 2006/0224093 | A1* | 10/2006 | Virag | A61F 5/0118 |
| | | | | 602/1 |
| 2012/0167308 | A1* | 7/2012 | Van Lear | A47C 27/085 |
| | | | | 5/655.5 |
| 2014/0237718 | A1* | 8/2014 | Burch | A63B 21/1473 |
| | | | | 5/417 |
| 2016/0287928 | A1* | 10/2016 | Darnell | A63B 21/4037 |

OTHER PUBLICATIONS

Professional Biomat. Jun. 24, 2013. Biotmat. https://www.biomat.com/faq/the-basics/ (Year: 2013).*

The Body Mat—A Testimonial by Shawn (formerly known as Gemstone Theraphy Bed). Oct. 7, 2015. YouTube. https://www.youtube.com/watch?v=NrWICW9rpCY (Year: 2015).*

Jennifer Von Behren. Oct. 29, 2014. Facebook. https://www.facebook.com/JenniferVonBehrenJVB (Year: 2014).*

CraftKlatch, Colorado Stone Coaster Craft Tutorial with Resin, Published Jan. 3, 2013, Accessed Mar. 15, 2019 https://www.youtube.com/watch?v=uxmq3Yh3GnU (Year: 2013).*

Brother J. Love, How to Make Orgonite for Health and Beauty, Published Apr. 16, 2016, Accessed Mar. 18, 2019 https://www.youtube.com/watch?v=UxtfdKHD2_M (Year: 2016).*

* cited by examiner

TREATMENT BODY MATS

RELATED PATENT DATA

This application claims the benefit of U.S. Provisional Patent Application Ser. No. 62/432,141, filed Dec. 9, 2016, entitled "Therapeutic Body Mats", the disclosures of which is incorporated herein by reference.

TECHNICAL FIELD

The disclosed invention pertains to treatment body mats and encompasses multiple embodiments.

BACKGROUND

Many types of stones and crystals are well known to have beneficial effects on health, healing and emotional wellbeing. Properties of various stones include, inter alia: balancing and/or increasing energy; detoxification; improving sleep; promoting self expression and confidence; providing calming effects; reducing negativity and negative emotions; stimulating vitality, motivation and/or creativity; pain relief; healing and/or relief from age associated issues; and amplification of thought. Some stones can enhance the effects or alter the properties of other stones when used together.

Various stones have been used for their individual and combined properties to provide their effects to humans and animals. The use of stones for promoting health and wellbeing is currently utilized alone or in combination with other techniques including holistic, naturopathic and/or conventional medicine practices. For overall wellbeing or providing multiple effects, it is often useful to utilize a combination of stones. However, it can be difficult or cumbersome to organize multiple stone types or expose an individual to a combination of stones simultaneously. It is desirable to provide methods and devices to allow exposure of an individual to a variety or combination of stones simultaneously.

DETAILED DESCRIPTION OF EXAMPLE EMBODIMENTS

Embodiments in accordance with the present invention are described below with reference to FIGS. 1-13.

Figure 1:
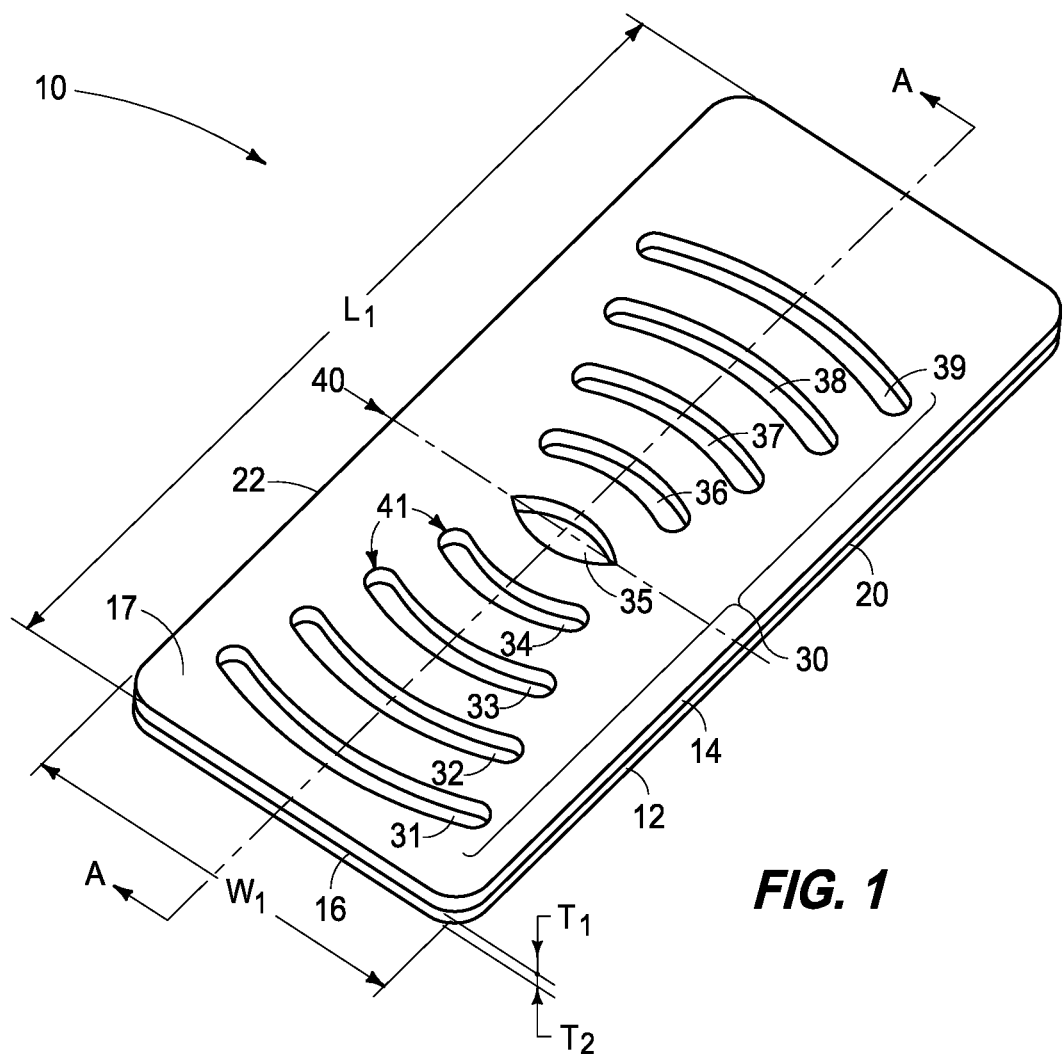
FIG. 1 is a view of a portion of an example device in accordance with one embodiment of the invention.

Referring initially to FIG. 1, an example body mat 10 in accordance with a first aspect of the invention is depicted. Body mat 10 has a lower mat portion 12 and an overlying upper mat portion 14. In the depiction, mat 10 is oriented such that a "top" edge 16 is on the left, with an opposing "bottom" end 18 on the right. When mat 10 is in use, a user can preferably be positioned such that the users head is proximate top end 10 and the users feet are proximate opposing end 18. Accordingly, mat 10 can be described as having a left edge 20 and a right edge 22 (determined if an individual is positioned lying face-up on the mat). Although the present description uses specific terminology such as "top", "bottom", "left" and "right" it is to be understood that these terms are utilized for convenience of description of the figures. In some instances, it may be desirable to utilize body mat 10 in alternative orientations.

Body mat 10 can have a pattern 30 of openings 31-39 that extend into the mat from the top surface 17 as depicted in FIG. 1. The pattern of openings depicted is but one preferred example of patterns that can be utilized in accordance with the invention. As depicted, pattern 30 has a line of symmetry 40 passing from the left side 20 to the right side 22 of mat 10, through the center of the pattern. It is to be understood that the center of the pattern need not correspond to the center of the mat in all instances.

In the example pattern depicted in FIG. 1, pattern 30 can be described as having a plurality of openings 31-39, extending sequentially from proximate top end 16 toward bottom end 18. The pattern shown has a total of nine individual openings with openings 31-34 being arc-shaped openings that progressively decrease in arc-length in the direction of the line of symmetry. The number of openings is not limited to the nine-opening configuration depicted. Utilization of a greater number or fewer openings is contemplated. Openings 36-39 are mirror images of openings 31-34 such that openings 36-39 progressively increase in arc length away from the line of symmetry. Center opening 35 can be an oblong "football" or "eye" shape as shown. It is to be understood that alternative opening shapes are contemplated for central opening 35 as well as for the laterally disposed openings. It is to be noted that the pattern depicted in FIG. 1 has an additional line of symmetry that passes centrally through from left to right on the drawing (top to bottom of the mat). In particular applications, it can be preferable that the pattern utilized has a dual line of symmetry such as the pattern shown.

The length $L_1$ and width $W_1$ of mat 10 as depicted in FIG. 1 are not limited to specific values. Length $L_1$ can be, for example, 72-76 inches. Width $W_1$ can be, for example, 24-34 inches. The length of openings 31-39 and the distance between adjacent openings can be constant (independent of overall mat dimensions) or can vary depending on mat length and width.

Openings 31-34 and 36-39 can preferably be of equivalent opening widths and can preferably have uniform width along substantially all the opening lengths, with the exception of the outermost ends. The outermost ends of the openings can preferably be rounded as shown. However, alternative end shapes are contemplated. An example opening width (openings 31-34 and 36-39) is from about 2.0 inches to about 3.0 inches. Opening 35 can have a maximum width (from left to right in FIG. 1) of, for example, from about 3.0 to about 4.25 inches.

Upper mat portion 14 and lower mat portion 12 can be formed of identical materials or can be formed of differing materials. Further, the material texture, hardness and flexibility can differ between upper and lower mat portions. Example materials that can be utilized for mat portions 12 and 14 include but are not limited to various foams including nylon foams, polyurethane foams, polyethylene foams, rubber foams, neoprene foams, etc., and combinations thereof. A specific material that can be utilized in one preferred embodiment is 1.5-2.5 pound density (preferably 1.75-2.0 pound density) extruded polyethylene expanded plank. The upper portion 14 and lower portion 12 can be of the same weight or differing weight density materials.

The thickness $T_1$ of upper mat portion 14 and thickness $T_2$ of lower mat portion 12 can be equivalent or can differ. Each of thickness $T_1$ and $T_2$ can be from about 0.25 to about 2.0 inches. In some embodiments it can be preferable to have an overall mat thickness $(T_1+T_2)$ of 1.0-3.0 inches.

Figure 2:
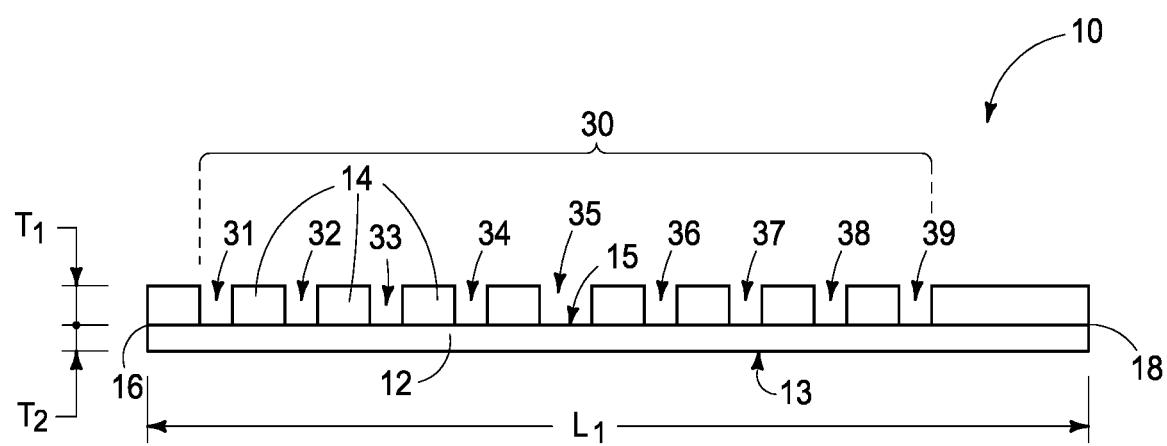
FIG. 2 is a cross-sectional view of the device depicted in FIG. 1, taken along line A-A' of FIG. 1.

Referring next to FIG. 2, such shows a cross-section of the mat 10 depicted in FIG. 1. An upper surface 15 of mat portion 10 can form an interface with upper portion 14. Portions 12 and 14 can be attached to one another across the interface. The two mat portions 12 and 14 can be joined by, for example, an adhesive seal or a heat seal.

Openings 31-39 can preferably extend through the entire thickness of upper mat portion 14. The pattern of openings can preferably be introduced through portion 14 prior to joining of the upper and lower mat portions. The depth of openings 31-39 can therefor correspond directly to the thickness of upper mat portion 14.

Openings 31-39 can be formed utilizing any of a number of methods, whether the openings extend entirely through an upper portion of mat 10, or extend only partially through a unitary mat. Example techniques for forming openings include but are not limited to manual or mechanical cutting (e.g. die cutting), laser cutting or water laser cutting. For cuts that extend only partially through a mat portion it may be preferable to utilize hot wire cutting. Alternatively, mats 10 and/or upper portion 14 can be molded to include openings into the mat.

In one embodiment, mat 10 can be configured for utilization in a commercial setting. An example configuration can have a mat length of 74 inched and width of 24.75 inches. In such embodiment the openings 31-34 and 36-39 can be arc-shaped and can have a central angle value of about 24 degrees. Lower mat portion 12 can have a thickness $T_2$ of 1.0 inch and upper mat portion 14 can have a thickness $T_1$ of 1.5 inches. In some settings, a wider mat width may be preferred. An example alternative size for commercial applications can include a mat width of 28 inches with arc-shaped openings 31-34 and 36-39 having central angles of 32 degrees.

Figure 3:
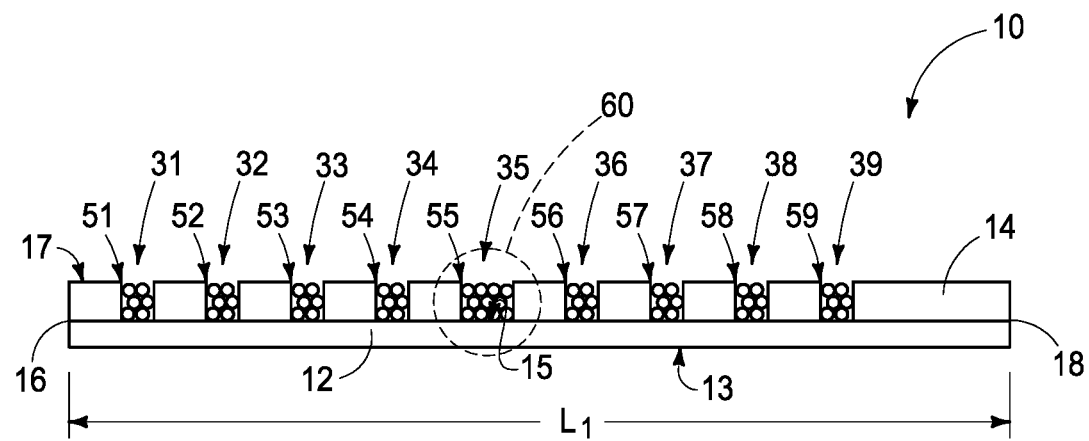
FIG. 3 depicts the cross-sectional view shown in FIG. 2 with additional features of the invention.

Referring to FIG. 3, body mat 10 is depicted with openings 31-39 containing corresponding materials 51-59. In preferred embodiments, each of materials 51-59 will differ relative to all other materials 51-59. Materials 51-59 can each comprise one or more types of stones. Preferably, each type of stone utilized can be selected based upon its properties, such as healing (emotional and/or physical), health and/or wellbeing properties. Example stones that can be utilized include but are not limited to quartz, howlite, amethyst, sodalite, kyanite, aventurine, citrine, carnelian, Herkimer diamonds, shungite, hematite, jasper, tiger's eye and petrified wood.

The specific materials and combination of materials for each opening is not limited. However, particular ordering of stones and combinations may be particularly beneficial for combined and synergistic effects. One example preferred embodiment for materials 51-59 are as follows: Material 51 comprises tumbled clear quartz, Herkimer diamonds (preferably 2), and shungite (preferably one piece);

Material 52 comprises tumbled amethyst;

Material 53 comprises tumbled sodalite:

Material 54 comprises tumbled blue howlite and blue kyanite (preferably seven blades);

Material 55 comprises tumbled green aventurine, tumbled rose quartz and

Shungite (preferably one piece);

Material 56 comprises tumbled citrine;

Material 57 comprises tumbled carnelian;

Material 58 comprises tumbled red jasper and tumbled hematite (preferably 9 pieces); and Material 59 comprises tumbled petrified wood, tumbled tiger's eye and shungite (preferably one piece).

Each of materials 51-59 can independently comprise, consist essentially of or consist of the particular stone(s) indicated above. In alternative embodiments, one or more of any of materials 51-59 can comprise differing or additional material(s) relative to those listed above, including stone types not specifically indicated herein.

In instances where the mat of the invention will be utilized in a commercial setting or other setting where the mat will not be moved regularly, the mat (including fill materials 51-59) can be relatively heavy (as compared with more portable mats described below). A specific example of approximate amounts of each of the fill materials for such stationary mats can be: 3 pieces of raw shungite at 5-8 grams each; 2 pieces of Herkimer diamonds at 9.5-15 grams each; 7 lbs 9 oz of tumbled clear quartz; 6 lbs 11 oz of tumbled amethyst; 5 lbs 2.5 oz of tumbled sodalite; 3 lbs 7 oz of tumbled blue howlite; 7 pieces of raw blue kyanite at 1.5-2.5 grams each; 12-15 oz tumbled rose quartz; 2 lbs 5 oz of tumbled green aventurine; 3 lbs 6 oz of tumbled citrine; 4 lbs 6 oz of tumbled carnelian; 5 lbs 3 oz of tumbled red jasper; 9 pieces of tumbled hematite at 10-15 grams each; and 5 lbs 8 oz of a mixture of 50% tumbled petrified wood and 50% tiger's eye. It is to be understood that other amounts can be utilized and that the amounts, particular stones and mixtures thereof can be altered or customized for a particular individual or desired effect.

Figure 4:
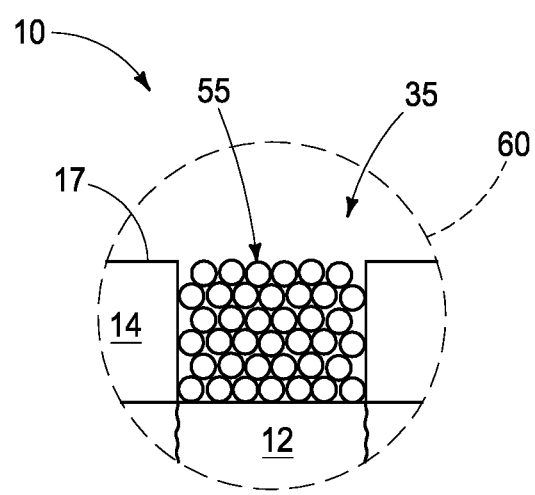
FIG. 4 shows an enlarged view of the circled portion 60 of FIG. 3.

Referring to FIG. 4, and enlarged view of circled region 60 (FIG. 3) is illustrated. As shown, material 55 substantially fills opening 35 such that material 55 is level with top surface 17 of body mat 10. It can be preferable that material 55 is level with surface 17 in order for material 55 to be in direct contact with an individual utilizing the body mat. It can be preferable that each of materials 51-54 and 56-59 be similarly level with upper surface 17. It is to be understood, however, that one or more of openings 31-39 can be less than entirely filled such that one or more of materials 51-59 do not directly contact the user.

Figure 5:
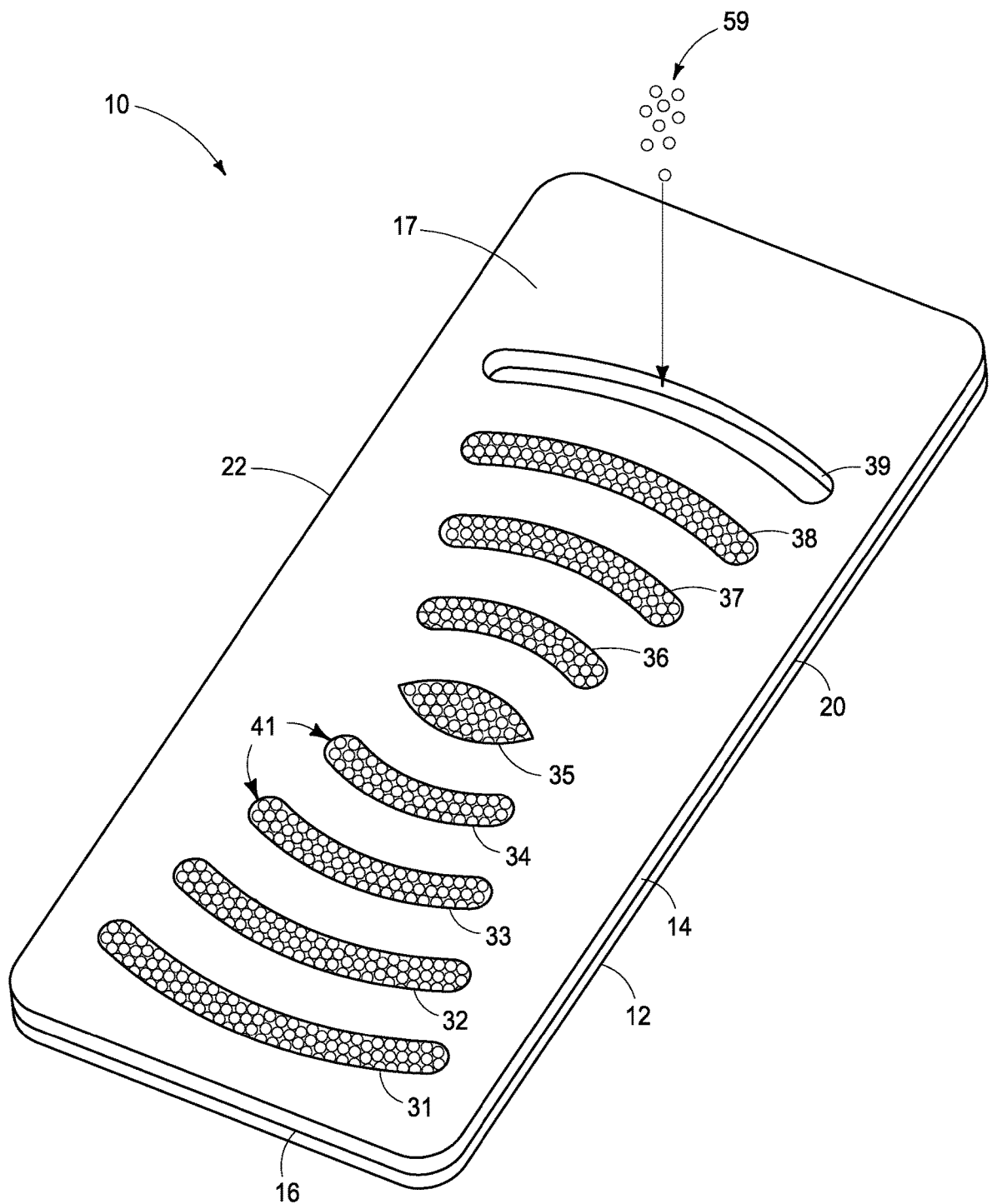
FIG. 5 shows the example device depicted in FIG. 1 with included features describe in FIG. 4.

FIG. 5 illustrates the mat 10 depicted in FIG. 1 with openings 31-39 containing loose stones. The mat illustrated can be configured for stationary use and can contain the types and amounts of the various stones described above. The various fill materials can be added prior to or subsequent to positioning of the mat. In particular instances, the fill material(s) for each of the openings can be provided and/or stored in separate containers and can be added to the openings after positioning of the mat or prior to each use.

Figure 6:
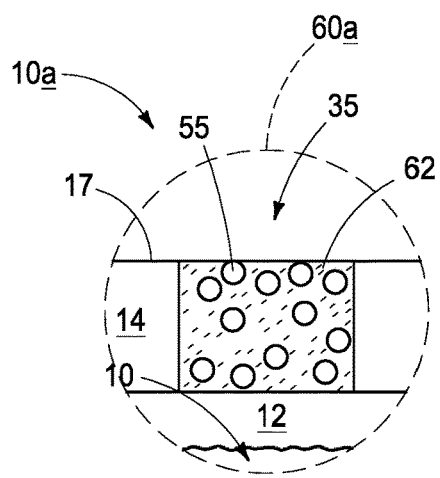
FIG. 6 shows an alternative embodiment of the enlarged view depicted in FIG. 4.
Figure 7:
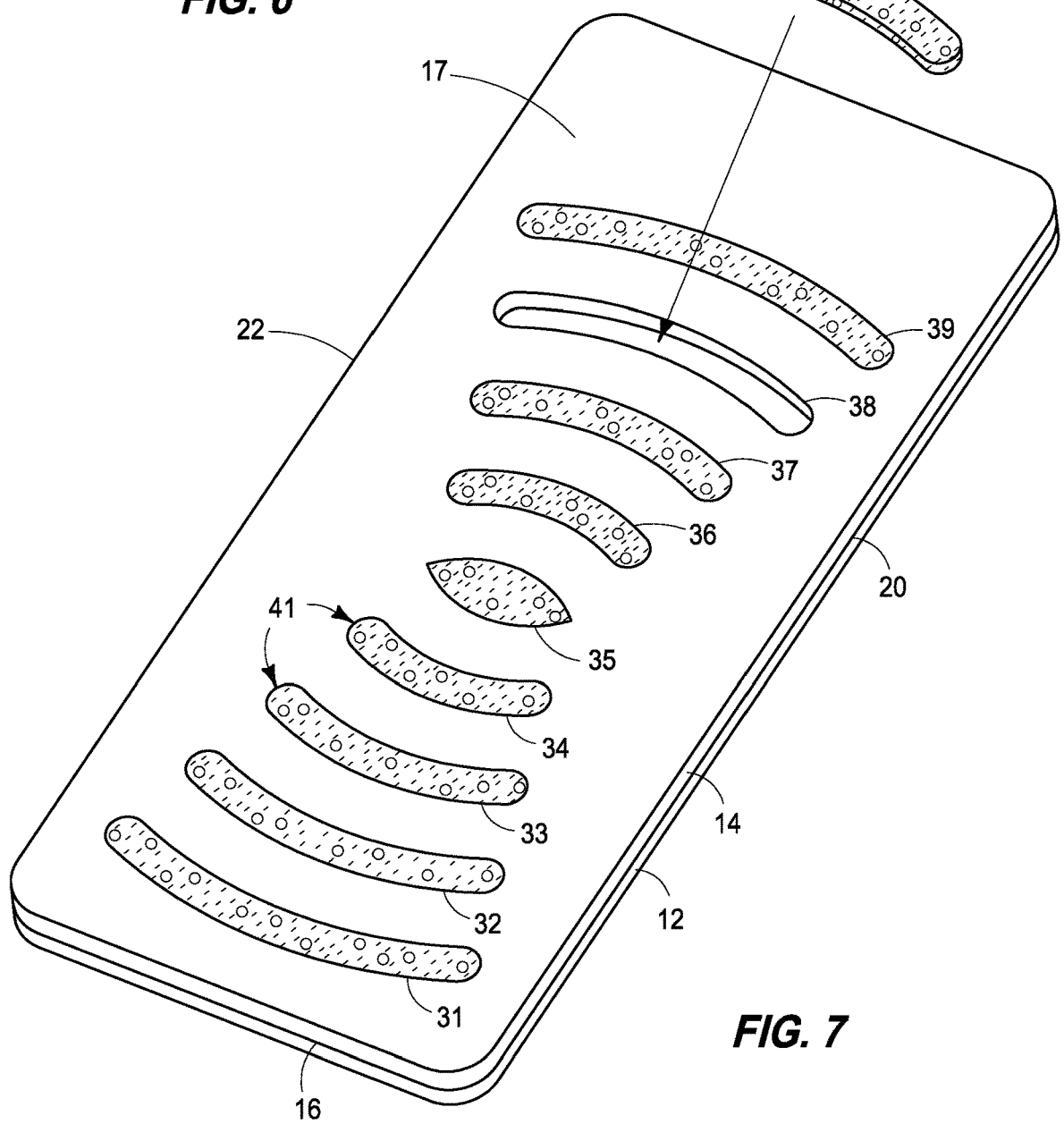
FIG. 7 shows the example device depicted in FIG. 1 with additional features shown in FIG. 6.

In the embodiment illustrated in FIGS. 3-5, the material within each of openings 31-39 consists of or consists essentially of stones. In alternative embodiments, each grouping of stones can be provided within a holder material. The holder material can be, for example, a bag (cloth, plastic, etc.) or other container or casing that is into the corresponding opening. In some embodiments, the stone groupings can be loose within individual containers/casings and can be removable therefrom. The ability to remove the stones from the casings can allow re-grouping and/or alternative mixing of stone types. An alternative embodiment is depicted in FIGS. 6-7. As shown in FIG. 6, opening 35 can alternatively contain a matrix material 62 in addition to material 55. Similarly, some or all of openings 31-34 and 36-39 can contain matrix material 62 in addition to their respective stone contents. The matrix materials within each opening can be the same or can differ and can be independently selected from various solidified gel materials, plastics, polymer material and/or silicone. In some instances, the openings can be filled with matrix material having stones embedded therein, either entirely through the depth of matrix or embedded only within a portion of the matrix. In some aspects, the matrix and/or stones may be removable from within the openings. It can be preferable to provide at least some of the stones at or near the upper surface of the matrix (possibly exposed on the surface) in order to contact or nearly contact the user of the mat. The openings can preferably filled that an upper surface of the matrix is even with or slightly below the upper surface of upper mat portion 14.

Matrix material 62 is not limited to a particular substance or composition. A variety of polymer materials are available that can be utilized for purposes of the invention. It particular applications, it can be preferable that matrix material be rigid. In other embodiments, Matrix material can be somewhat flexible to allow give during repositioning of the mat or removal/insertion of the matrix/stones within openings. Matrix 62 can be translucent or opaque. Where a translucent matrix is provided, the matrix can be clear (non-colored) or can be colored. The color (or lack of color) of matrix used for each opening can be the same or can differ. In some instances, the color(s) of matrix material 62 can be coordinated with specific stones or stone mixtures. An example of a matrix material that can be utilized is CLEAR FLEX™ (Smooth-On Inc., 5600 Lower Macungie Road Macungie PA) (e.g. CLEAR FLEX™ 95). Such material can be utilized in clear form, or can be colored with any of a variety of pigments. It is to be understood that alternative matrix materials are contemplated.

Where a matrix material is utilized, the amount/weights of stones utilized can be those discussed above. In some instances, the amounts of stones utilized can be decreased relative to loose-stone embodiments to provide sufficient matrix volume. FIG. 7 illustrates the mat 10 of FIG. 1 having matrix material 62 included with the stones in each of openings 31-39. The matrix material with embedded stones can be provided as an insert that can be positioned within the correspondingly sized opening as depicted. The matrix/stone portions 100 can be permanently positioned within the openings or can be configured to be removable.

Formation of the matrix/stone portions can preferably be accomplished utilizing molds. Molding of inserts can comprise addition of stones followed by addition of matrix material within the mold. Alternatively, the stones and matrix material can be mixed prior to adding to the molds. The molds can preferably be treated with a mold-release agent prior to adding stones or matrix material. In most instances, the molding process can be performed at room temperature and atmospheric pressure. Optionally, pressurization can be utilized during the molding process. It can be advantageous to utilize pressurization to assist in removal of bubbles within the matrix material, however removal of bubbles is not mandatory since the presence of some bubbles may not be detrimental.

Figure 8:
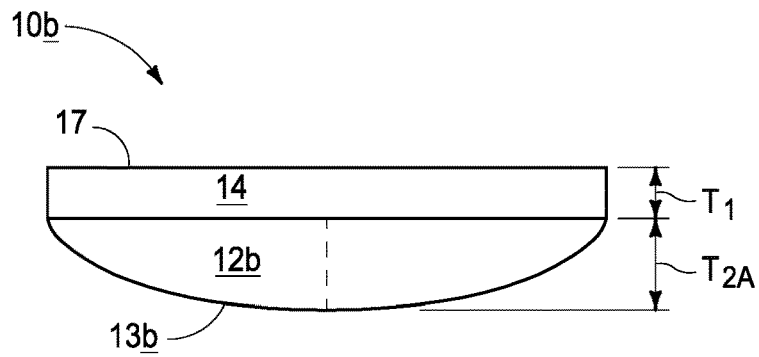
FIG. 8 is a cross-sectional view of an alternative embodiment relative to FIG. 1.

The body mats of the present invention described above are suitable for use with the mat positioned on a table (e.g. massage table), on the floor, on the ground or any other open surface. In some instances it may be desirable to utilize a body mat of the invention in a hyperbaric chamber. Such use can provide combined benefits of both the chamber and the mat and can be synergistic. Depicted in FIG. 8 is an alternative embodiment 10b, of the mat 10 shown in FIG. 1. As shown, mat 10b can have lower portion 12b of body mat 10b that is rounded (or alternatively shaped) to conform to the shape of the platform or bottom surface within the chamber. Bottom surface 13b depicted in FIG. 8 can be place directly on the chamber surface or otherwise appropriately placed. Body mat 10b can have any of the mat configurations and features discussed above along with modified lower portion 12b. Lower portion 12b may have a total thickness along the longitudinal center that is greater than the thickness of bottom portion 10 above. The invention additionally contemplates utilization of a textured bottom surface, Velcro attachments, straps, etc. to assist in retaining a desired positioning of the mat within a chamber or in any desired location.

In chamber applications, it can be preferable to include the various stones in the following quantities: 3 pieces of raw shungite at 5-8 grams each; 2 pieces of Herkimer diamonds at 9.5-15 grams each; 4 lbs 10 oz of tumbled clear quartz; 4 lbs of tumbled amethyst; 3 lbs 5 oz of tumbled sodalite; 3 lbs 3 oz of tumbled blue howlite; 7 pieces of raw blue kyanite at 1.5-2.5 grams each; 12-15 oz tumbled rose quartz; 1 lbs 14 oz of tumbled green aventurine; 2 lbs 15 oz of tumbled citrine; 3 lbs 10 oz of tumbled carnelian; 4 lbs 5 oz of tumbled red jasper; 9 pieces of tumbled hematite at 10-15 grams each; and 4 lbs 13 oz of a mixture of 50% tumbled petrified wood and 50% tiger's eye.

Additional embodiments of the invention are discussed with reference to FIGS. 9-12. These figures depict embodiments of more portable body mats relative to those set forth above.

For embodiments of the invention where the mat is to be a more portable may, for example a personal mat, any of the above shapes and dimensions can be utilized. However, for increased portability, a preferred overall mat thickness can be from about 1.0 to about 2.0 inches. The decreased thickness can afford a weight mat portion and can also have more shallow openings with less fill material. In particular embodiments, a portable mat can contain the following quantities of stones: 3 pieces of raw shungite at 5-8 grams each; 2 pieces of Herkimer diamonds at 9.5-15 grams each; 1 lbs 12 oz of tumbled clear quartz; 1 lbs 2 oz of tumbled amethyst; 1 lbs 6 oz of tumbled sodalite; 1 lbs 1.5 oz of tumbled blue howlite; 5-6 pieces of raw blue kyanite at 1.5-2.5 grams each; 4-5 oz tumbled rose quartz; 11.5 oz of tumbled green aventurine; 1 lbs 3 oz of tumbled citrine; 1 lbs 5.5 oz of tumbled carnelian; 1 lbs 5 oz of tumbled red jasper; 7 pieces of tumbled hematite at 10-15 grams each; and 1 lbs 11 oz of a mixture of 50% tumbled petrified wood and 50% tiger's eye.

The portable mat can be provided in the loose stone configuration or stone/matrix configuration as discussed above. It can be preferable to provide the stones portion in a removable form to allow folding or rolling of the mat portion and separate containment of the stones. Stones or removable matrix/stone inserts can be provided in individual containers (packets, pouches, bags, bins, etc.) to allow groupings of stones to remain isolated from one another. The containers can optionally be labeled to indicate the specific opening for which each material is intended.

Figure 9:
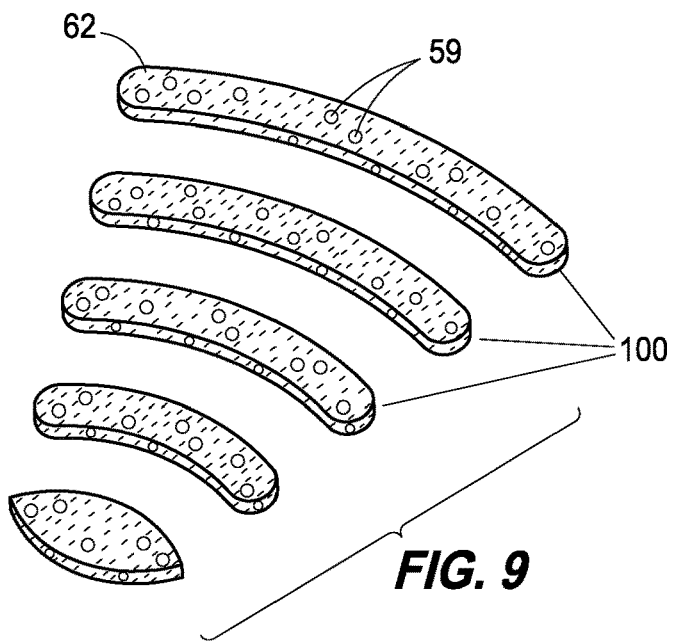
FIG. 9 shows an alternative embodiment of the invention.

With reference to FIG. 9, an embodiment of the invention is depicted having removable inserts 100 that comprise matrix material 62 and stones 55, 56, 57, 58, 59. Each insert 100 is configured to be removably inserted into one of the corresponding openings 35-39. Accordingly, each insert is shaped to match the shape of the opening into which it will be inserted (inserts corresponding to openings 31-34 are not shown). As indicated above, matrix material 62 can preferably be flexible to allow ease of insertion and removal. For openings of differing shape relative to those depicted, inserts 100 can be configured to have shapes matching the corresponding openings.

Figure 10:
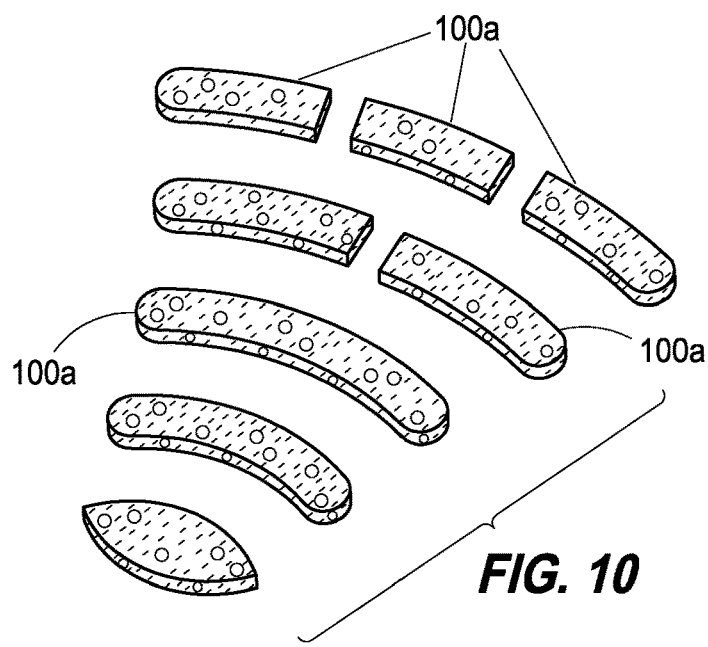
FIG. 10 shows a variation of the embodiment depicted in FIG. 9.

In some instances, some or all of inserts 100 can be provided in multiple parts. One possible configuration of multi-portion inserts is depicted in FIG. 10. As depicted, inserts 100a corresponding to the outermost openings (31, 39) can be divided into three portions and inserts corresponding to the second largest openings (32, 38) can be divided into two parts. The divided inserts can allow easier insertion and removal and can additionally allow easier portability and storage. It is to be understood that the shapes and number of parts of the multi-portion inserts can differ relative to that depicted, and fewer or more of the individual inserts can be provided in multiple pieces.

Although the multi-portion inserts are described with reference to portable mats, analogous multi-portion inserts can also be utilized with any alternative mat configuration including the stationary mats described above.

Figure 11:
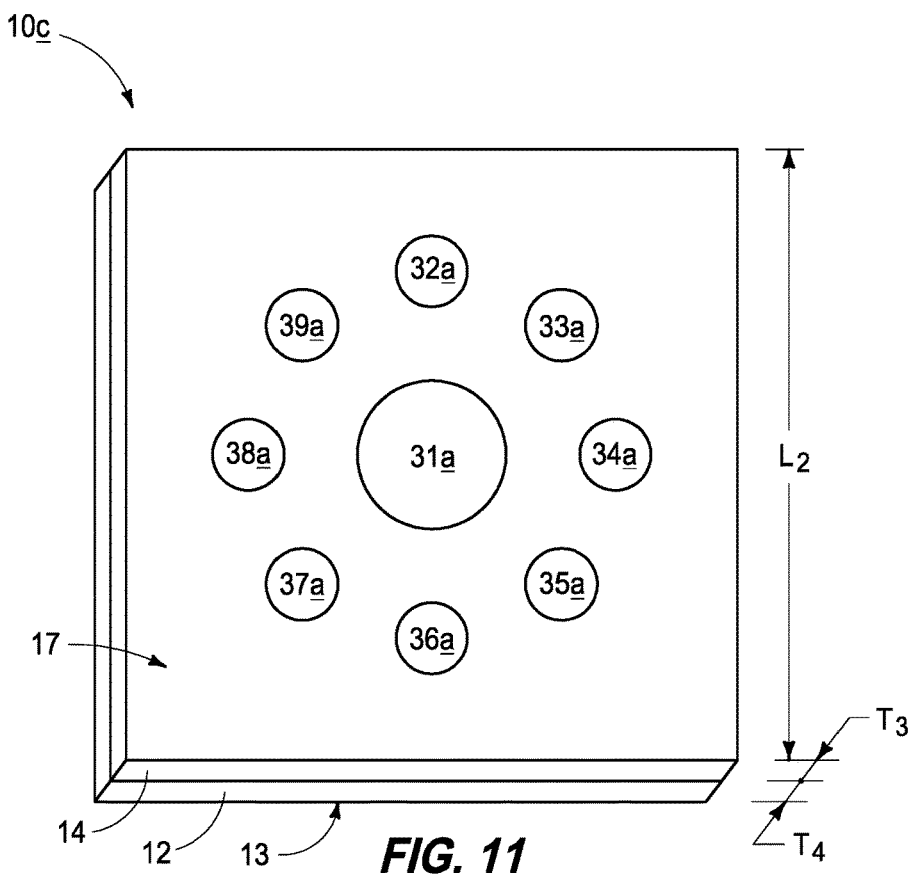
FIG. 11 depicts another example embodiment of the invention.
Figure 12:
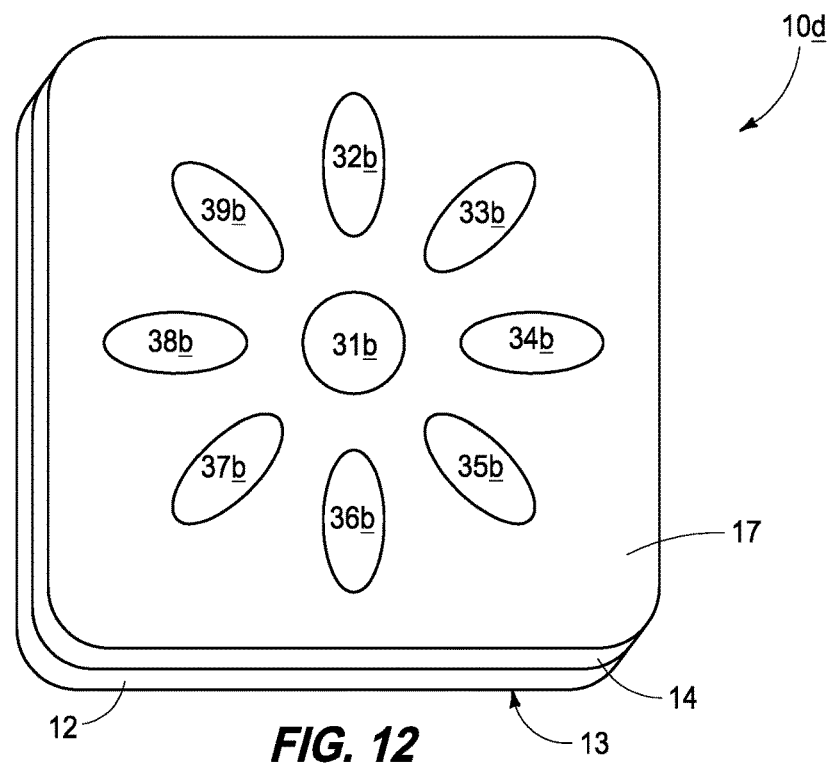
FIG. 12 depicts a variation of the embodiment of the invention depicted in FIG. 11.

Additional mat configurations are described with reference to FIGS. 11-12. Body mats 10c (FIG. 11) and 10d (FIG. 12) can be square as depicted, or can have an alternative shape such as round, oval, polygonal (pentagonal, hexagonal etc.) or any other shape. Preferably, these more portable body mats can have a centrally disposed opening 31a/31b, surrounded by a plurality of additional openings (32a-39a/32b-39b). Openings 31-39 (a or b) can contain materials 51-59, with or without matrix material, as discussed above. Although FIGS. 11 and 12 show openings 32-39 sequential in clockwise order, such is only one preferred embodiment. Such openings can alternatively progress counterclockwise or be in any alternative order. However, it can be preferable in all instances to have central opening be opening 31(a or b), containing material 51 or similar material (e.g. clear quartz, one or more Herkimer diamond(s) and optionally shungite; with or without matrix material).

FIGS. 11 and 12 each depict a pattern having circular central opening 31a/b with eight evenly spaced surrounding openings that are either round (32a-39a) or oval, or petal/oblong/eye-shaped (32b-39b). However other opening shapes are contemplated for any or all of the central and surrounding openings.

In the embodiments depicted in FIGS. 11-12, body mats 10c and 10d can preferably be smaller than those depicted above. Length $L_2$ of the FIGS. 11-12 mats can be for example, approximately 1.5-3.0 ft. Smaller and/or fewer stones can be utilized with these smaller mats to accommodate the smaller mat size. Further, it can be preferable that one or both of mat portions 12 and 14 be relatively thin such that the overall mat thickness is from about 1 inch to about 1.5 inches. The stones may be removable (from openings or from matrix contained within the openings). The stones can be optionally provided separately from the foam portions and can be provided separately in labeled containers to identify which stone material is to be placed into each correspondingly labeled opening.

Referring to FIG. 12, the corners of the illustrated body mat are depicted as being rounded. Alternatively contoured corners are also contemplated for each of the described embodiments. Corners can be, for example, rounded, angled, squared (90°), or alternatively contoured. Further, any of the embodiments can have mat edges (side, top and/or bottom edges) that are contoured or alternatively shaped relative to the straight edges depicted in the examples illustrated.

Example quantities of stones that can be utilized in the smaller mats depicted in FIGS. 11 and 12 can be: 1 piece of raw shungite at 5-8 grams; 1 piece of Herkimer diamonds at 9.5-15 grams; 8.75 oz of tumbled clear quartz; 8 oz of tumbled amethyst; 9.8 oz of tumbled sodalite; 6.4 oz of tumbled blue howlite; 4-8 pieces of raw blue kyanite at 1.5-2.5 grams each; 2.9 oz tumbled rose quartz; 5.2 oz of tumbled green aventurine; 8.8 oz of tumbled citrine; 9.4 oz of tumbled carnelian; 6.2 oz of tumbled red jasper; 4 pieces of tumbled hematite at 10-15 grams each; and 7.8 oz of a mixture of 50% tumbled petrified wood and 50% tiger's eye.

The various embodiments of body mats described can utilize differing quantities of stones depending on the specific mat size, opening pattern and presence/amount of matrix material. The amounts set forth herein are intended to be examples and alternative quantities can be utilized. Additionally, the invention contemplates use of alternative or additional types of stone and/or stone combinations relative to those specifically mentioned herein. Specific stones and stone combinations can also be customized for a particular individual and/or treatment.

The treatment mats of the invention described above can be utilized for animals as wells as for humans. The mat configuration and stones utilized can be further modified for animals based on animal species and/or size. For example, a "dog-size" mat can be provided to have a length of 24 inches and a width of 36 inches. A, example "cat-size" mat can have a length of 12 inches and a width of 18 inches. Alternative sizes can be utilized based upon a particular size of animal. However, it is to be understood that a specific size of mat can be utilized for any body size or species.

For "pet" mats that are relatively small as compared to larger mats discussed above, the openings and/or fill quantities can be reduced proportional or non-proportional to the amounts set forth above. The shape of each of the openings can be any of those set forth above or can be unique. In some instances, linear openings can be utilized for pet mats (as well as for any of the mats described above).

Figure 13:
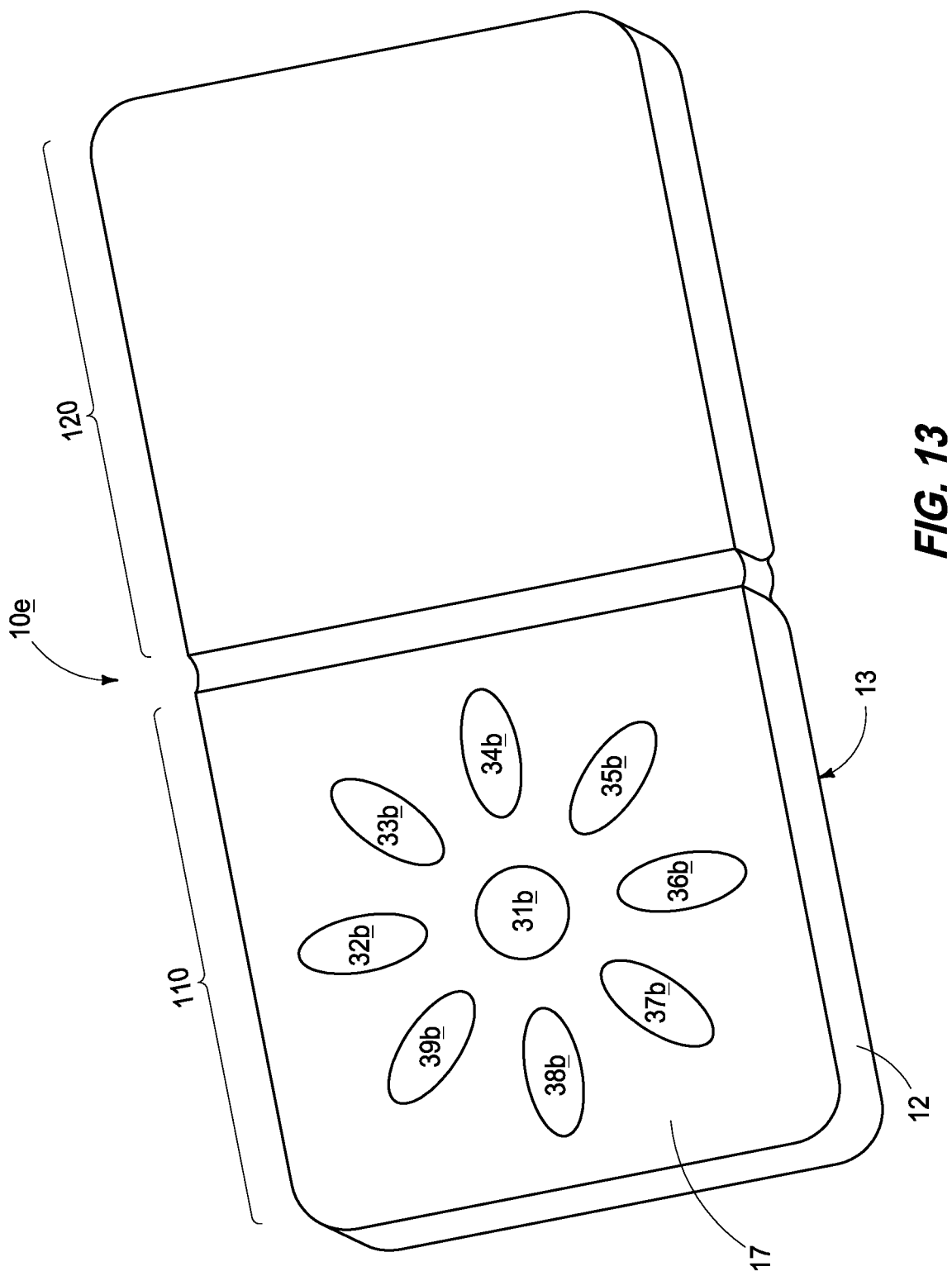
FIG. 13 is another alternative embodiment of the invention.

An additional mat configuration 10e is depicted in FIG. 13. The depicted mat can have a first portion 110 that is analogous to the mat configuration shown in FIG. 11 or 12. A second portion 120 can comprise mat material that can be any of those discussed above or can be of an alternative cushion-type material. As shown in FIG. 13, bottom portion 12 of portion 110 and portion 120 can be a unitary mat portion. A folding region 122 can be provided between portion 110 and portion 120 that allows portion 120 to be folded and positioned over or beneath portion 110.

Mat 10e can be configured to have any of the mat thicknesses discussed above. In some instances, unitary portion 12 can have a thickness $T_2$ of about 0.25-0.5 inches and upper mat portion 14 can have a thickness $T_1$ of about 0.75-1.0 inches.

An attachment device 124/126 can be provided to secure portions 110 and 120 into a desired position. Device 124/126 can be hook and loop type fastener as depicted or can be an alternative type fastener including but not limited to snaps, ties, buttons, hooks, etc. Mat 10e can be utilized in the folded configuration for sitting and can be positioned on a chair, sofa, floor, etc. Alternatively, mat 10e can be utilized in a "open" position with portion 120 positioned against a chair back, sofa back, wall, etc.

Use of the mats of the invention is not limited to adults. Accordingly, the various mat configurations discussed above can be utilized for children or can be scales down for smaller bodies. For example, a "crib/toddler bed" mat can be provided having any of the opening configurations set forth above. A crib/toddler mat can have a size of 27 inches width and 51 inches length to conform to standard crib and toddler bed sizing.

In addition to the features depicted and discussed above, the invention contemplates optionally including one or more lights within opening(s) within the various body mats. Lights can be embedded within a matrix (if present) or positioned within loose stones. Lights can be provided to be one or more colors. In some instances, the color of light provided within each opening can correspond to the color of stones utilized within the particular opening. The light(s) can be battery powered or AC. When the light option is battery powered, the appropriate battery unit can be provided externally to the mat or can be embedded within the foam material.

Although the embodiments set forth above are described as having a single lower mat portion and a single upper mat portion, it is to be understood that either or both of such portions can comprise multiple foam parts (sections and/or layers).

The body mats of the invention can beneficially provide convenient exposure to a combination of stones simultaneously. The mats are movable and customizable. Differing stone combinations can be provided based upon the needs or desires of the individual user. The mats can be provided as sets including mat portions and stones or insert portions. Further, it is contemplated that the stone/insert portions can be sets, individual groupings, individual stone types, set of inserts or individual inserts, and can provided separately from the may portion.

The invention additionally encompasses methods of exposure to the properties of stones. The methodology includes providing a mat of the invention and exposing an individual to the stones in the mat. Positioning the individual on the mat in a lying down or sitting position can achieve the exposing of the individual. Alternatively, a mat of the invention can be placed over or against an object and the individual can be positioned against the mat.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

What is claimed is:

1. A treatment mat, comprising:
    a mat material portion having an upper surface;
    a pattern of openings extending into the mat material from the upper surface, each of the openings having a predetermined shape;
    a solid matrix material within each of the openings, the solid matrix material being transparent, being formed to match the predetermined shape of the corresponding opening and comprising urethane rubber; and
    one or more types of stones encased in the matrix material within each of the openings.

2. The treatment mat of claim 1, wherein each of the openings comprises at least one type of stone that differs from stones within every other of the openings.

3. The treatment mat of claim 1, wherein the pattern of openings consists of nine openings.

4. The treatment mat of claim 1, wherein the stones and matrix material are removable from the openings.

5. The treatment mat of claim 1, wherein at least some of the stones are selected from the group consisting of quartz, howlite, amethyst, sodalite, kyanite, aventurine, citrine, carnelian, Herkimer diamond, shungite, hematite, jasper, tiger's eye and petrified wood.

6. The treatment mat of claim 1, having a symmetrical pattern of openings, the pattern having a central opening and two opposing series of lateral openings, a line of symmetry being disposed through the central opening.

7. The treatment mat of claim 6 wherein the lateral openings are arc-shaped.

8. A treatment mat comprising:
    a base mat portion;
    an upper mat portion over the base mat portion;
    a plurality of openings extending through the upper mat portion to an upper surface of the lower mat portion, each of the openings having a predetermined shape;
    a solid matrix material comprising urethane rubber within each of the openings, the solid matrix material of each opening being transparent and being formed to have a shape corresponding to the pre-determined shape of the opening; and
    one or more types of stones encased within the matrix material within each of the openings, at least four of the openings containing mixtures of two or more differing stone types.

9. The treatment mat of claim 8, wherein at least some of the stones are selected from the group consisting of quartz, howlite, amethyst, sodalite, kyanite, aventurine, citrine, carnelian, Herkimer diamond, shungite, hematite, jasper, tiger's eye and petrified wood.

10. The treatment mat of claim 8, wherein the matrix material is formed as inserts which are removable from the openings.

11. A method of exposing an individual to stones comprising:
    providing a mat comprising a mat material having an upper surface;
    providing a plurality of openings extending into the mat material from the upper surface, each opening having a predetermined shape;
    providing one or more varieties of stone within each of the openings, at least four of the openings containing mixtures of two or more differing stone types, the one or more stone varieties being encased within a transparent solid matrix material that comprises urethane rubber and is shaped to match the predetermined shape of the corresponding opening; and
    positioning an individual proximate the mat.

12. The method of claim 11, wherein the individual is a human.

13. The method of claim 12, wherein the human is a child.

14. The method of claim 11, wherein the individual is an animal.

15. The method of claim 11, wherein at least some of the varieties of stones are selected from the group consisting of quartz, howlite, amethyst, sodalite, kyanite, aventurine, citrine, carnelian, Herkimer diamond, shungite, hematite, jasper, tiger's eye and petrified wood.

\* \* \* \* \*